United States Patent [19]

Laghi

[11] Patent Number: 5,080,592
[45] Date of Patent: Jan. 14, 1992

[54] VARIABLE ACTION QUINCUNX PINPLATE

[76] Inventor: Aldo A. Laghi, P.O. Box 431, Clifton Park, N.Y. 12065

[21] Appl. No.: 532,940

[22] Filed: Jun. 4, 1990

[51] Int. Cl.$^5$ ............................................. G09B 23/00
[52] U.S. Cl. ................................. 434/188; 273/120 R
[58] Field of Search ............... 434/188, 200, 429, 407, 434/208; 273/120 R, 121 B

[56] References Cited

U.S. PATENT DOCUMENTS

| | | | |
|---|---|---|---|
| 1,531,401 | 3/1925 | Kawai | 273/120 R |
| 1,534,390 | 4/1925 | Horton | 273/120 R |
| 1,636,893 | 7/1927 | Biberfeld | 273/120 R |
| 2,742,291 | 4/1956 | Simon | 273/120 R |
| 3,433,484 | 3/1969 | Wallenmeyer | 273/120 R X |
| 3,758,113 | 7/1973 | Trbovich et al. | 273/120 R |
| 3,951,412 | 4/1976 | Adams | 273/246 |
| 4,900,255 | 2/1990 | Laghi | 434/188 |

FOREIGN PATENT DOCUMENTS 909726  10/1962  United Kingdom ............ 273/120 R

*Primary Examiner*—Richard J. Apley
*Assistant Examiner*—Rachel M. Healey
*Attorney, Agent, or Firm*—Schmeiser, Morelle & Watts

[57] ABSTRACT

A statistics teaching aid of the Quincunx type. The device includes a pinplate which has at least one movable row of pins. Shifting of the movable pinrow effectively increases or decreases the number of pinrows on the pinplate. By shifting the pinrow, an operator can alter the shape of the resulting distribution of balls.

12 Claims, 2 Drawing Sheets

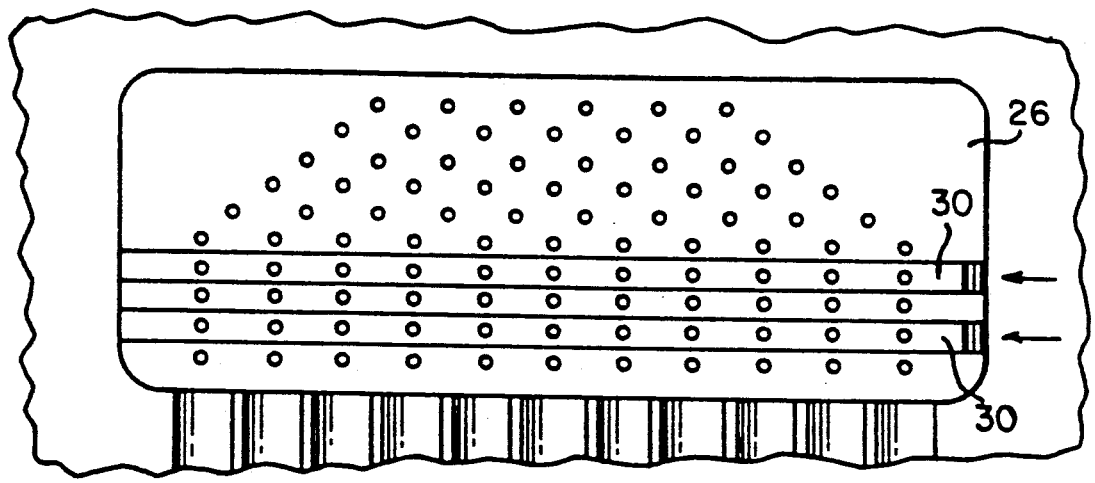
FIG. 2
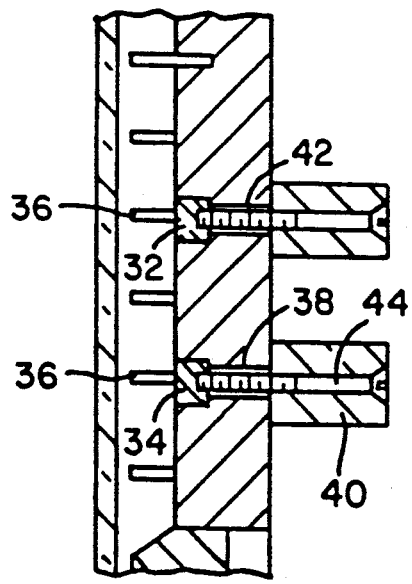
FIG. 3
FIG. 4
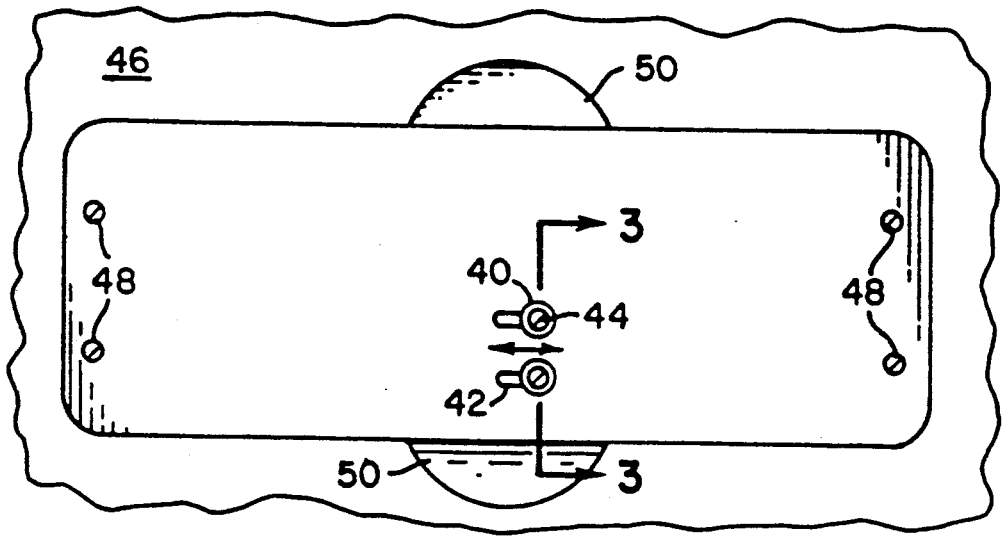

VARIABLE ACTION QUINCUNX PINPLATE

FIELD OF THE INVENTION

The invention is in the field of educational aids for the study of statistics. More specifically, the invention is a Quincunx apparatus that includes a modified pinplate that allows the operator to, in effect, vary the number of rows of pins.

BACKGROUND OF THE INVENTION

A number of visual aids are often employed in the teaching and study of statistics. These aids range from simple coins to computer generated curves and graphs. A common device specifically designed for statistical modeling is the Quincunx which was invented by Lord Francis Galton in the 1870's.

A Quincunx employs a funnel shaped conduit to direct a dropped ball downwardly into a pinplate. The pinplate includes a number of spaced rows of outwardly extending pins. Each pin is separated from its neighboring pin by a distance slightly greater than the diameter of the dropped ball. As the ball passes downwardly through the pinplate, it bounces off one pin in each row of pins.

Each row of pins represents an independent disturbance or decision point. When the ball hits one of the pins, it can randomly fall to either the right or left side of the pin. Therefore, if the pinplate includes ten rows of pins, a dropped ball would make ten "choices" in direction before it left the pinplate. After passing through the last row of pins, the ball falls into a "stacking" area.

The stacking area comprises a series of vertically extending receiving grooves or slots. As the dropped ball leaves the pinplate, it falls into the slot directly below its exit point from the pinplate. One or more ball-stops are located in the stacking area and function to stop the ball's downward progress. The dropped balls stack up atop the ball-stop(s) and thereby illustrate the distribution which results from the decision path of the balls through the pinplate. The ballstop(s) can be moved to a "release" position which allows the stacked balls to fall into a bottom reservoir.

A Quincunx is often used to demonstrate process capabilities or stacking of tolerances. For example, if ten washers are to be stacked and each washer is picked at random from a supply having equal numbers of washers of two different sizes, there is a large range of possible stack heights. If the two sizes of washers are one-inch and two-inches respectively, and one happens to pick ten one-inch washers, the stack height will be ten inches. If only two-inch washers are picked, the stack height will be 20 inches., Most likely however, the final stack height will be between these extremes. If a large number of washers are picked, approximately one half will be of one size and the other half will be of the other size. For the above example, one would have the greatest probability of picking five, one-inch washers and five, two-inch washers. Therefore, the probable stack height would be fifteen inches.

A Quincunx could be used to illustrate the above example. A single ball would be dropped from the conduit into a pinplate having ten rows of pins. Each row of pins represents one pick of a washer. If the ball falls to the right, this would represent choosing a two-inch washer. If the ball falls to the left, this represents a one-inch washer being chosen.

Below the pinplate would be located ten groves or slots labeled "10" through "20" respectively with the leftmost groove being labeled "10". These grooves would represent the final stack height.

Dropping a large number of balls into the pinplate would simulate an equally large number of attempts at stacking. The balls would stack up in the grooves and illustrate the distribution of probable stack heights. The balls collected in the grooves would eventually fall into a bell-shaped pattern called a "normal" or "Gausslan" distribution. In this example, the top of the curve would most likely be located in the groove marked "15" and this would indicate that the most probable stack height would be 15 inches.

The problem with the prior art Quincunx devices arises when it is desired to change the number of pin-rows (rows of pins) used in the pinplate. If, for example, only five washers were to be picked, one would want a pinplate having only five rows of pins. The normal method of accomplishing this change is to replace the pinplate with another having the desired number of pinrows. This requires the user to have a supply of replacement pinplates that have different numbers of pinrows.

The above solution, while workable, poses a number of problems. One is required to purchase and store the additional replacement pinplates. This is especially onerous when a large number of pinplates are needed. Replacing one pinplate with another is a time consuming procedure that is inconvenient during a teaching session. Also, due to the critical placement of the ball receiving slots below the gaps in the bottom pinrow, the pinplate is required to be an exact, tight fit. A major problem arises since pinplates and Quincunxes are commonly made from wood. The wood expands and contracts depending on such factors as wood type, grain pattern and the wood sealing materials that were used. Therefore, the manufacturing tolerances required for the pinplate and the Quincunx hole into which it fits are critical. These tolerances are extremely hard to meet and this sometimes leads to the pinplate being a poor fit and thereby being hard to remove without breakage of the plate or the Quincunx.

Therefore, the present method of providing a measure of versatility to the Quincunx to illustrate changing conditions is unsatisfactory for most situations and effectively limits the use of the device. In addition, the manufacturing time and skill required to make the device is excessive.

SUMMARY OFF THE INVENTION

The instant invention is an improved Quincunx that is easy to use and far more versatile than previous devices of this type. The invention involves a modified pinplate that allows the operator to effectively change the number of pinrows without removing the pinplate. Since there is no need to remove the pinplate, the manufacture of the Quincunx is greatly simplified. The tight tolerances required by the prior art devices is eliminated. In addition, the overall cost of the device is lessened because one is no longer required to own and store a plurality of pinplates with different numbers of pinrows. Finally, the use of the Quincunx in a classroom environment is greatly enhanced since the operator can effectively change the number of pinrows in a matter of

BRIEF DESCRIPTION OF THE DRAWINGS

FIG. 2 is a detailed frontal view of the Quincunx pinplate with the movable pinrows in a different position than shown in FIG. 1.

FIG. 3 is cross-sectional view of the Quincunx portion shown in FIG. 2.

FIG. 4 is a rear view of the Quincunx portion shown in FIG. 2.

DETAILED DESCRIPTION OF THE DRAWINGS

Figure 1:
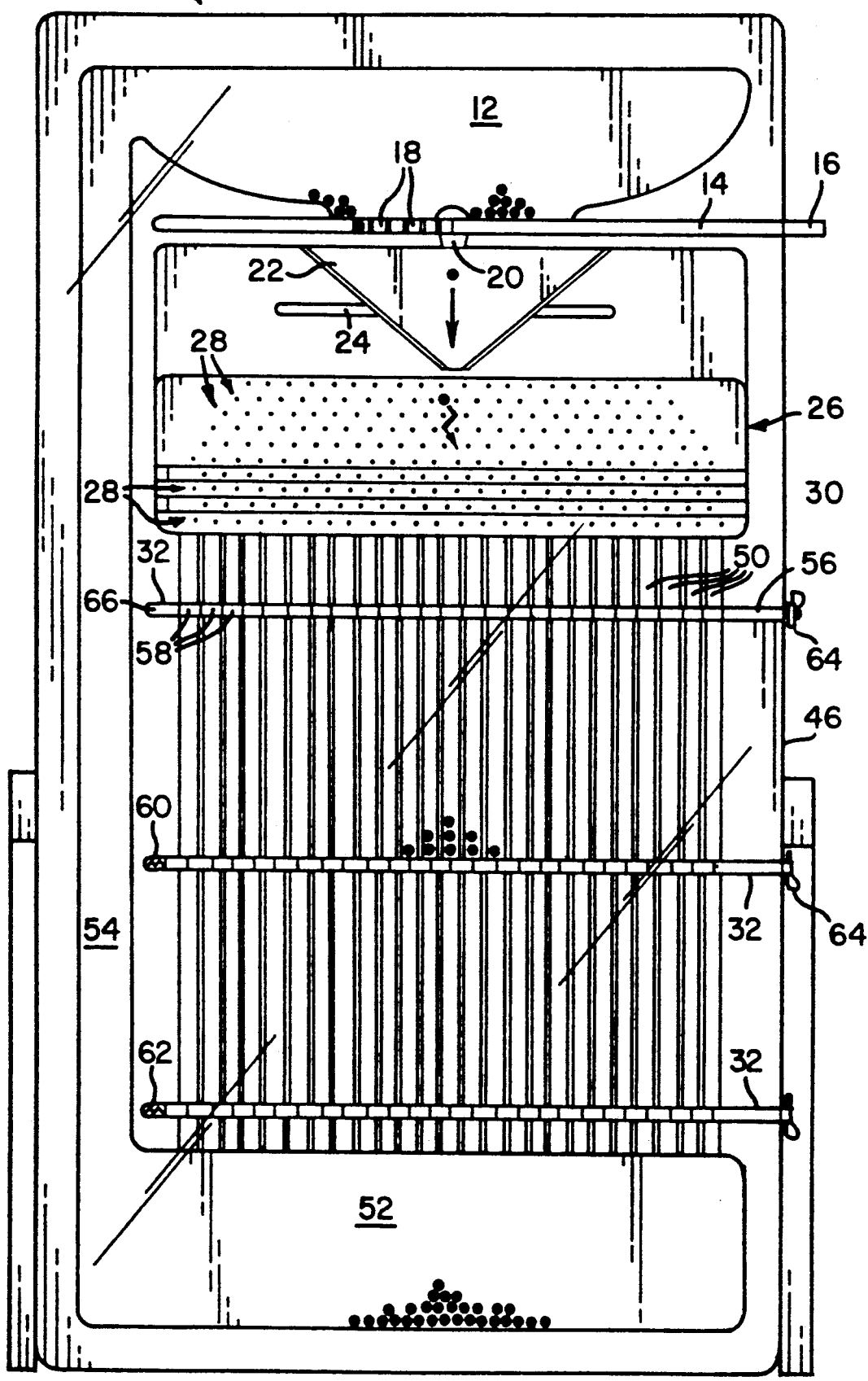
FIG. 1 is a front view of a modified Quincunx.

Referring now to the drawings in greater detail, wherein like reference characters refer to like parts throughout the several figures, there is shown by the numeral 10 a Quincunx type of statistics teaching device. The device comprises a top ball reservoir 12, a movable funnel shaped conduit 22 and a pinplate 26. Below the pinplate is the ball stacking area which comprises a row of vertically extending grooves 50. Located laterally across the grooves are a number of spring loaded ball-stops 32. At the bottom of the Quincunx, is a ball collection reservoir 52. A side passage 54 connects the bottom ball reservoir 52 to the top ball reservoir 12.

Between the top ball reservoir 12 and the conduit 22 there is a movable feeder member 14 that includes an exterior handle 16. The feeder member includes a plurality of slots 18 which are each sized to receive a ball from the upper reservoir. Below the feeder member is an entry orifice 20 which allows one ball at a time to fall into the movable conduit 22.

The rear wall of the conduit includes a rearwardly extending handle member (not shown) that is accessible from the rear of the device. The handle is horizontally movable and slides within slot 24. The handle is used to position the conduit over a desired region of the pinplate.

Located below the conduit is the pinplate 26. The pinplate shown includes ten horizontal rows of pins. Each row of pins, or pinrow, includes a large number of pins that are spaced from each other by a distance that is greater than the diameter of the balls to be used in the device. The pinplate shown includes eight stationary pinrows 28 and two movable pinrows 30.

FIG. 1 shows the movable pinrows in a first position in which their pins are staggered relative to the adjacent stationary rows of pins.

FIGS. 2-4 show, in more detail, the Quincunx in the region of the pinplate.

In FIG. 2, the movable pinrows 30 can be seen in their second position. As shown, the pins of the movable pinrows are in line with the pins of the stationary adjacent pinrows. By thus doing, the pins of the movable pinrows no longer interfere with the downward travel of a ball.

As can be seen in FIG. 3, each movable pinrow comprises a base member 32 which is slidably received within a groove 34 in the pinplate. Extending outwardly from an exterior surface of the base member are a plurality of pins 36. Extending rearwardly from the base member is a handle comprising a connecting shaft 38 and outer grip member 40.

The connecting shaft is located within a horizontally extending slot 42. This location allows horizontal movement of the shaft. FIG. 3 shows a bolt 44 being used for the connection shaft with the head of the bolt being received within the grip member.

FIG. 4 shows a rear view of the pinplate. In this view, the two slots 42 can be easily seen and an arrow is shown illustrating the allowed side-to-side movement. The slots are sized to allow the pinrow to move a distance equal to one-half of the pin spacing. The pinplate is attached to the main support board 46 of the device by four fasteners 48. Two indents 50 are located above and below the pinplate to facilitate any required removal of the pinplate from the support board.

Returning to FIG. 1, a plurality of grooves 50 are located beneath the pinplate. These grooves are fashioned by either a milling operation of the main support board or by adding long strips to the face of the support board to thereby make the sidewalls of the grooves. These grooves run between the pinplate 26 and lower reservoir 52.

In order to stop the downward movement of the balls, a number of ball-stops 32 are placed at intermediate locations in the grooves. Dropped balls stack up atop the ball-stops and thereby illustrate the final ball distribution after the balls have passed through the pinplate.

Each of the ball-stops comprises a long member 56 having a plurality of slots 58 along its outer surface. The long member is slidably retained on the outer surface of the support board by a slot 60 which runs substantially the entire width of the device. Within the slot and located at the leftward end of the member is a biasing spring 62.

Located on the right side of the device are a series of clamps 64 which are used to lock the ball-stop member in its leftwardmost position (note the locked top ball-stop 66). In this position, the slots 58 are aligned with the grooves and do not act to stop the downward progress of the balls. The clamps 64, when in their released position, allow their associated ball-stops to move to their rightmost position due to the action of the biasing springs 62 (note the bottom two ball-stops). In this position, the slots 58 are staggered from the grooves and thereby do not allow any downward movement of the balls.

Once the balls are allowed past the ball stops, they freely fall into the bottom reservoir 52.

In operation, one would start with all of the balls in the upper reservoir 12. If one wanted to use a pinplate having ten pinrows, the movable pin rows would be positioned as shown in FIG. 1. If only six pinrows were required, the movable pin rows would be positioned as shown in FIG. 2. A single movable pinrow can be moved to obtain a pinplate having, in effect, eight rows of pins.

The feeder member 14 would be shifted from right to left to feed balls into the orifice 20. From there, the balls would fall into the conduit 22 where they would be directed into the top of the pinplate. The balls would then bounce from pinrow to pinrow as they fall downwardly due to the force of gravity. As each ball hits a pin, the ball would randomly fall to either the right or left. Upon exiting the pinplate, each ball would enter one of the grooves 50.

As shown in FIG. 1, the balls would collect above one of the ball-stops and thereby illustrate a normal distribution based on the above random right or left shifts in direction.

Finally, the balls would be allowed to fall into the bottom reservoir 52. The balls can be returned to the top reservoir by appropriate shifting of the device to allow the balls to travel through passageway 54.

It should be noted that the number of shiftable pinrows can be more or less than shown. For the pictured device, five movable pinrows could have been used. By alternating the stationary and movable pinrows, the device can have, in effect, zero to ten pinrows. Alternating the pinrows (movable/stationary) enables the operator to reduce or increase the effective pinrows by two by shifting only a single movable pinrow.

The embodiment disclosed herein has been discussed for the purpose of familiarizing the reader with the novel aspects of the invention. Although a preferred embodiment of the invention has been shown and described, many changes, modifications and substitutions may be made by one having ordinary skill in the art without necessarily departing from the spirit and scope of the invention.

I claim:

1. An improved Quincunx of the type having a top ball feed section, a pinplate below the ball feed section and a series of ball collecting grooves below the pinplate, the improvement comprising:
    at least one movable row of pins attached to said pinplate whereby an operator can move said at least one movable row of pins from a first position wherein said pins of said at least one movable row of pins are located directly below a series of spaces between pins of a row of pins above said movable row of pins, to a second position wherein said pins of said at least one movable row of pins are located directly below said pins of said row of pins above said movable row of pins wherein said pinplate has a plurality of horizontally and vertically spaced pins and said horizontal pin spacing is a predetermined amount greater than a diameter of a ball which is to pass through said pinplate and said movable row of pins can move a horizontal distance equal to approximately one-half of said predetermined distance.

2. The Quincunx of claim 1 further comprising a handle means attached to said at least one movable row of pins whereby an operator can move said movable row of pins by moving said handle means.

3. The Quincunx of claim 2 wherein said pinplate has a front surface and a rear surface and wherein said pins extend outwardly from said front surface and said handle means extends outwardly from said rear surface.

4. The Quincunx of claim 1 wherein there are at least two movable rows of pins attached to said pinplate.

5. A training device for use in the teaching and studying of statistics comprising:
    a support board having a top portion, middle portion and a bottom portion;
    a ball entry means located on said top portion of said board;
    a plurality of vertically spaced rows of horizontally spaced pins located on said middle portion of said board, said pins extending outwardly relative to a front face of said board and said horizontal pin spacing being greater than a diameter of a ball to be used in said device;
    at least one of said rows of pins being horizontally movable whereby said movable pinrow can be in either a first position in which its pins interfere with a downward passage of a ball through the pinplate and thereby cause a change in the ball's direction or in a second position in which a ball can pass through said movable row of pins without any change in direction; and
    a ball collection means located below said pins.

6. The device of claim 5 further comprising a handle means attached to said at least one movable pinrow for facilitating an operator's moving said pinrow from said first position to said second position.

7. The device of claim 6 wherein said handle means extends from a rear surface of said device.

8. The device of claim 5 wherein said at least one movable pinrow can move a horizontal distance approximately equal to one-half the horizontal spacing between adjacent pins.

9. The device of claim 5 wherein said pins are located on a pinplate attached to said support board and said at least one movable row of pins comprises a plurality of pins which extend from a front surface of a slidable member which is movably attached to said pinplate.

10. The device of claim 9 wherein said pinplate comprises at least one horizontally oriented elongate slot which receives said slidable member.

11. The device of claim 5 wherein said movable row of pins is located relative to at least one row of non-moving pins so that moving said movable pinrow to said second position results in allowing a ball to pass through two rows of pins without and change in direction.

12. A training device for use in the teaching and studying of statistics comprising:
    a support board having a top portion, middle portion and a bottom portion;
    a ball entry means located on said top portion of said board;
    a plurality of vertically spaced rows of horizontally spaced pins located on said middle portion of said board, said pins extending outwardly relative to a front face of said board and said horizontal pin spacing being greater than a diameter of a ball to be used in said device;
    at least one of said rows of pins being movable whereby said movable pinrow can be in either a first position in which its pins interfere with a downward passage of a ball through the pinplate and thereby cause a change in the ball's direction or in a second position in which a ball can pass through said movable row of pins without any change in direction; and
    a ball collection means located below said pins wherein said at least one movable row of pins is movable in a horizontal direction.

* * * * *